April 4, 1967     T. GASSINO ETAL     3,312,393
STORING DEVICE FOR A CALCULATING OR LIKE MACHINE Filed Nov. 9, 1965     3 Sheets-Sheet 3

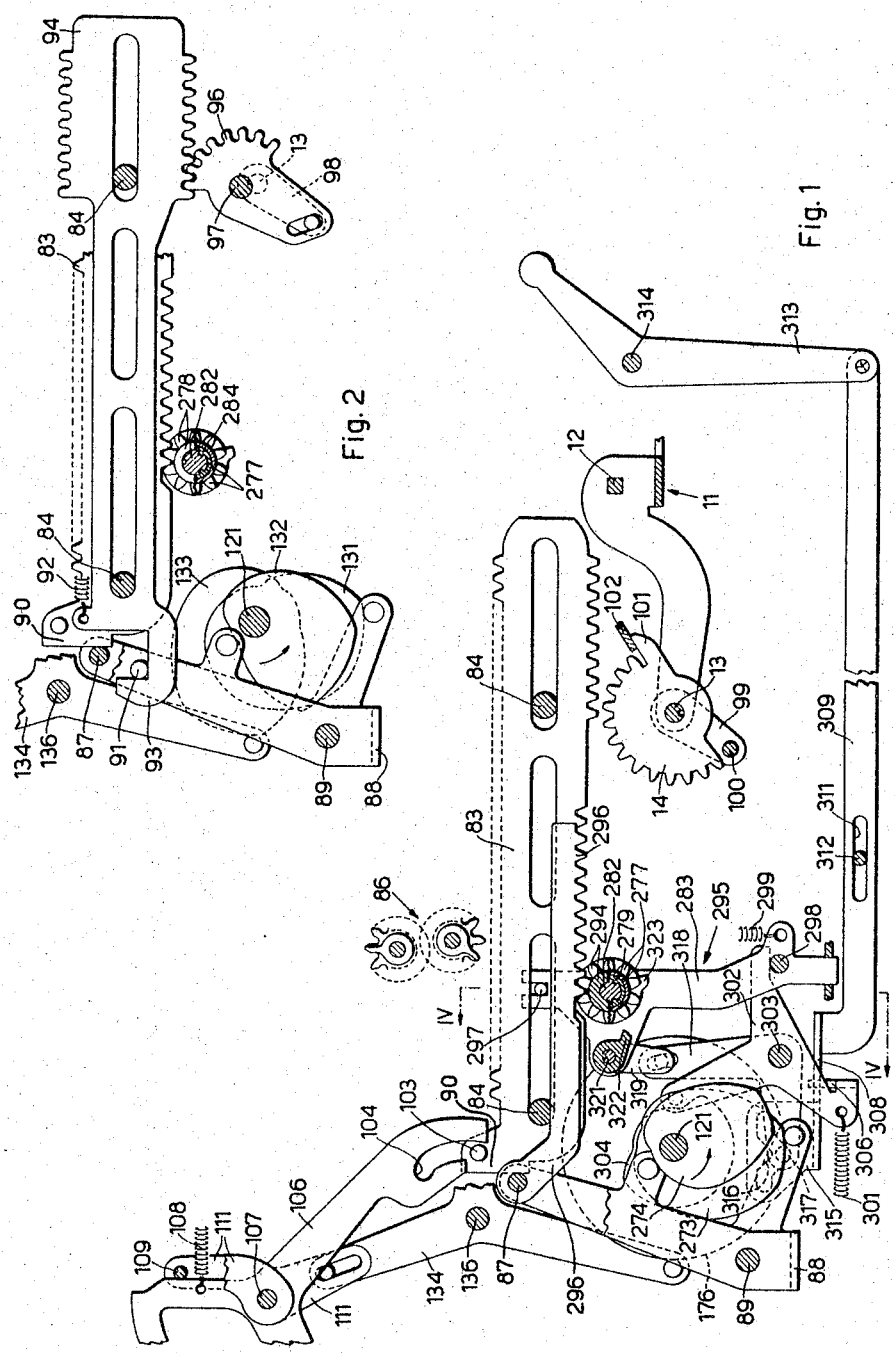

*INVENTORS*
*TERESIO GASSINO*
*MICHELE BOVIO*
BY *John Toggenburger*
*AGENT*

United States Patent Office 3,312,393
Patented Apr. 4, 1967

3,312,393
STORING DEVICE FOR A CALCULATING
OR LIKE MACHINE
Teresio Gassino, Ivrea, Turin, and Michele Bovio, Banchette, Turin, Italy, assignors to Ing. C. Olivetti & C., S.p.A., Ivrea, Italy, a corporation of Italy
Filed Nov. 9, 1965, Ser. No. 506,922
Claims priority, application Italy, Nov. 11, 1964, 24,427/64; Sept. 10, 1965, 20,692/65
12 Claims. (Cl. 235—60)

This invention relates to a storing device for a calculating or like machine having a set of actuators differentially movable under the control of a universal bar reciprocable through a forward and a return stroke comprising a set of pinions rotatably mounted on a shaft and engageable with said actuators, and stop means cooperating with a zero position determining cam associated with each one of said pinions.

There are known storing devices of the above kind, wherein the pinions are positively zeroized before a new amount is stored by means secured to the shaft of the pinions and operated irrespective of the universal bar of the actuators. Said storing devices are generally intricate and expensive to manufacture.

In a known calculating machine a set up carriage comprises a set of variably settable pinions adapted to cooperate with a corresponding set of reciprocable calculating racks. Said pinions are also adapted to be positively engaged by a key provided on a shaft, which is rotated through a forward stroke concomitantly with a universal bar for said racks. During the return stroke of the universal bar the shaft is yieldably restored by a spring. When the key engages the pinions, since these are then standing, the shock thereof may produce an overrun and an erroneous accumulation of the amount.

This disadvantage is obviated by the storing device according to the invention, which is characterized in that said shaft is reciprocably oscillated by means operated concomitantly with said universal bar, means being provided for causing said pinions to be frictionally driven by said shaft, whereby an amount may be transferred from said actuators to said pinions, as well as from said pinions to said actuators.

According to another characteristic of the invention said actuators are engageable with a set of variably setting members reciprocable therewith under the control of a second universal bar reciprocable concomitantly with said first universal bar, whereby said actuators may be positively moved through both their strokes, said pinions when engaged with said actuators being frictionally driven so as to move said settable members and said actuators substantially before being engaged by said universal bars to reduce the shock thereof, said universal bars positively adjusting the final portion of said actuators and said settable members.

These and other characteristics of the invention will become apparent from the following detailed description of two preferred embodiments thereof, made with reference to the accompanying drawings, wherein:

FIG. 1 is a left hand longitudinal partial sectional view of a calculating machine incorporating a storing device according to a first embodiment of the invention;

FIG. 2 is another left hand longitudinal partial sectional view of the machine;

Figure 3:
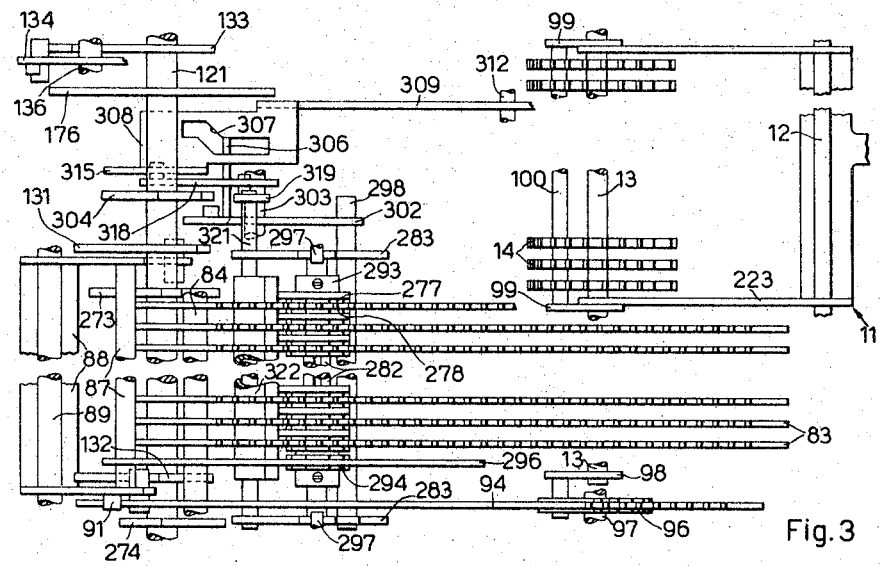
FIG. 3 is a partial plan view of the machine.

With reference to FIG. 1, the calculating machine comprises a set of differentially movable actuators formed of racks 83 slidably mounted on two stationary shafts 84. The calculating machine comprises also a set of variably settable members or toothed sectors 14 rotatably and slidably mounted on a shaft 13. The sectors 14 are carried by a set up carriage 11 transversely movable step by step on the shaft 13 and on a square shaft 12. The sectors 14 may be sequentially set clockwise from the zero position shown in FIG. 1, by means of a ten key keyboard in the manner described in the copending United States patent application Ser. No. 398,915. The shaft 12 is rockably mounted on the machine frame for causing the sectors 14 to engage and disengage the racks 83. A totalizer 86 is also adapted to engage and disengage the racks 83 in a manner known per se.

The calculating machine is also provided with a main shaft 121 adapted to be cyclically rotated counterclockwise at a predetermined speed in the case a single cycle is to be effected, and at a higher speed in the case a set of repeated cycles is to be effected. The single cycle will be hereinafter named lower speed cycle, whereas the repeated cycles will be named higher speed cycles. In order to effect the higher speed cycles the main shaft 121 is axially shifted rightwards so as to cause a second set of cams to cooperate with the various cam followers, in the manner described in a patent application Ser. No. 506,958 entitled "Power Driving Device for a Calculating Machine" filed the same day of the present patent application.

Secured to the shaft 121 is a pair of cams 131 and 132 (FIG. 2) normally cooperating with a bail 88 pivoted on a stationary shaft 89 and carrying a universal bar 87 adapted to engage a projection 90 of the racks 83. A second pair of cams 273 and 274 (FIG. 1) secured to the shaft 121 are adapted to cooperate with the bail 88 when the shaft 121 is displaced rightwards (upwards in FIG. 3). The bail 88 is provided with a pin 91 normally contacted by a projection 93 (FIG. 2) of a rack 94 under the urge of a spring 92. The rack 94 is slidably mounted on the shafts 84 and engages a toothed sector 96 fulcrumed on a stationary pivot 97. The sector 96 is pin and slot connected with an arm 98 secured to the shaft 13. A second universal bar 100 (FIG. 3) is secured to a pair of arms 99 bodily rotatably and axially slidable on the shaft 13. The bar 100 is adapted to engage a projection 101 (FIG. 1) of the sectors 14.

Furthermore, each rack 83 is provided with a pin 103 adapted to cooperate with a notch 104 of a corresponding type-carrier controlling lever 106 known per se. The levers 106 are fulcrumed on a stationary shaft 107 and are normally urged by a corresponding spring 108 to contact another universal bar 109 carried by a pair of arms 111 pivoted on the shaft 107. One of the arms 111 is pin and slot connected to a lever 134 fulcrumed on a pivot 136 and normally cooperating with a cam 133 (FIG. 2) of the shaft 121. A circular disk 176 (FIG. 1) secured to the shaft 121 is adapted to cooperate with the lever 134 when the shaft 121 is shifted rightwards to effect the higher speed cycles.

At the beginning of each cycle of the shaft 121, the sectors 14 engage the racks 83. Then the bail 88 is rocked counterclockwise thus displacing the universal bar 87 through a forward stroke. Simultaneously the pin 91 (FIG. 2) of the bail 88, through the rack 94, the sectors 96, the arm 98, the shaft 13 and the arms 99 (FIG. 1) displace the universal bar 100 counterclockwise. The bar 100 engages thus the projections 101, which are returned to contact a stationary stop 102. The sectors 14 are thus temporarily zeroized, while the racks are differentially moved rearwards. Thereafter bail 88 is rocked clockwise and causes the universal bar 87 to effect a return stroke, while the universal bar 100 is returned clockwise. The universal bar 87 engages now the projections 90 of the racks 83, which are returned at rest while the sectors 14 return to their set position.

In the case the shaft 121 effects a lower speed cycle, the cam 133 (FIG. 2), through the lever 134 and the universal bar 109 (FIG. 1), causes the levers 106 to follow the pins 103, thus predisposing the typecarriers not shown in the drawings to print the amount represented by the racks. On the contrary, in the case the shaft 121 effects a higher speed cycle, the disk 176 prevents the universal bar 109 from being rocked clockwise, whereby the levers 106 cannot predispose the typecarriers and the amount is not printed.

The calculating machine is provided with a storing device comprising a set of pinions 277 and 278 (FIG. 2) normally engaging the racks 83. The pinions 277 (FIG. 4) engage the rack 83 of the odd orders (beginning from right in FIG. 4) and are rotatably mounted each one on two sleeves 279 and 281, bodily rotatable and axially slidable on a fluted shaft 282. Each sleeve 279 and 281 is provided with a flange 284, and 286 respectively, the two flat surfaces of which have a high coefficient of friction. The pinions 278 engage the racks 83 of the even orders and are provided with two notches 287 engaged by two lugs 288 of a disk 289 rotatably mounted on the shaft 282.

Secured to the right end of the shaft 282 is a hub 293, whereas secured to the left end thereof is a pinion 294 engaging a rack 296 (FIG. 1) fulcrumed on the universal bar 87. A compression spring 292 (FIG. 4) is located between each disk 289 and a ring 291 integral with each pinion 278. Each spring 292 (FIG. 4) normally urges the corresponding pinion 278 to contact the flange 286, and the corresponding disk 289 to contact the flange 284, whereby each pinion 277 is contacted by the two adjacent flanges 284 and 286.

The shaft 282 is rotatably mounted on a pair of flanks 283 of a frame, generically indicated by the numeral 295, which comprises also a transverse bar 298. The frame 295 is vertically slidable on a pair of stationary pins 297 and is urged upwards by a spring 299 (FIG. 1) thus normally holding the pinions 277 and 278 engaged with the racks 83.

The storing device is also provided with first control means for causing the pinions 277 and 278 to engage and disengage the racks 83, said control means comprising a lever 302 (FIG. 1) rotatably mounted and axially slidable on a stationary shaft 303. The lever 302 is normally urged by a spring 301 to contact an end of the bar 298 protruding from the right flank 283 (FIG. 4) of the frame 295, the spring 299 (FIG. 1) prevailing over the spring 301. The lever 302 is adapted to cooperate with a cam 304 of the main shaft 121, but it is normally transversely distanced at left therefrom as shown in FIG. 3.

Rotatably mounted on the flanks 283 is another shaft 321 secured to a stop bar 322, which is adapted to cooperate with a tooth 323 of each pinion 277, 278 for determining the zero position thereof. The bar 322 is normally out of the path of the various teeth 323. Second control means are provided for rendering the stop bar 322 effective, said second control means comprising a lever 318 fulcrumed on the shaft 303 and pin and slot connected with an arm 319 secured to the shaft 321.

Finally, an operating member is provided for operating the first and second control means, said member being formed of a slide 309 longitudinally slidable by means of a slot 311 on a stationary pin 312 and linked to a lever 313 manually or automatically operable from the rest position shown in FIG 1 to a pair of opposite effective positions, in the manner which will be hereinafter described. The slide 309 is provided with a bent portion 308 (FIG. 3) having a cam slot 307 engaging a lug 306 of the lever 302. In turn bent from the portion 308 is also a vertical lug 315 having a V-shaped cam slot 316 engaging a pin 317 of the lever 318.

The storing device operates as follows.

Figure 4:
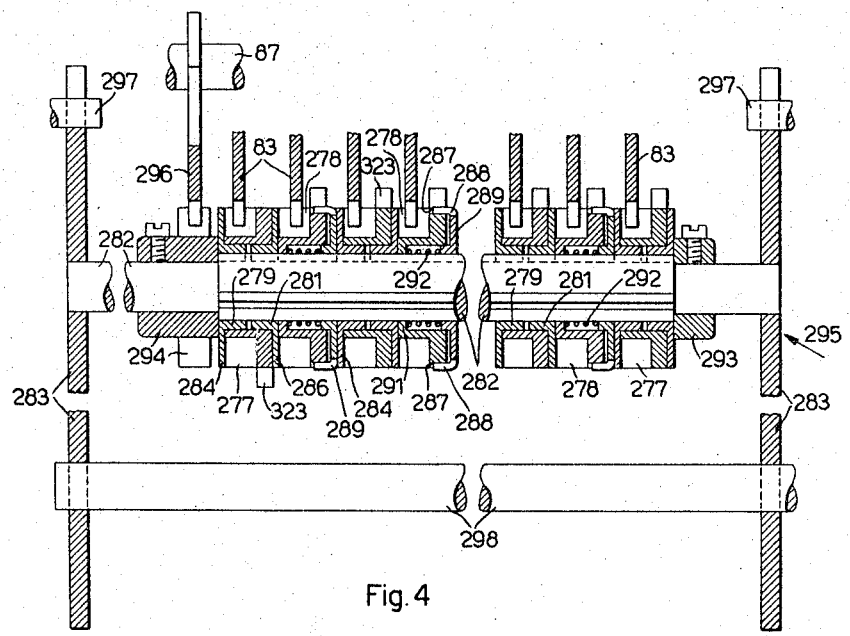
FIG. 4 is a partial transverse sectional view in an enlarged scale, taken according to the line VI—VI of FIG. 1.

Normally, when the lever 313 is in its rest position as in FIG. 1, the bar 322 is out of the path of the teeth 323, and the lever 302 (FIG. 3) is at left of the cam 304, whereby the pinions 277 and 278 engage the racks 83. During any cycle of the main shaft 121, when the universal bar 87 begins its forward stroke (leftwards in FIG. 1), the rack 296 rotates the pinion 294 counterclockwise together with the shaft 282 and the sleeves 279 and 281 (FIG. 4). The flanges 284 and 286 thus frictionally drive the pinions 277 and the disks 289 together with the pinions 278, whereby the pinions 277 and 278 begin to displace the racks 83 rearwards, before the universal bar 100 (FIG. 1) engages the projections 101 of the sectors 14. The shock of the universal bar 100 on the projections 101 is thus avoided or reduced, the universal bar 100 merely adjusting positively the final position of the sectors 14 to contact the stop 102.

Similarly, when the universal bar 87 begins its rearward stroke, the rack 296 rotates the shaft 282 clockwise, whereby the flanges 284 and 286 (FIG. 4) frictionally drive the pinions 277 and 278, thus displacing the racks 83 forwards before being engaged by the universal bar 87 (FIG. 1). The shock of the bar 87 against the projections 90 of the racks 83 is thus avoided or reduced, the universal bar 87 merely adjusting positively the rest position of the racks 83.

Therefore, when the lever 313 is in the position of FIG. 1, at the end of each machine cycle the pinions 277 and 278 return to their initial position, whereby an amount stored therein remains in the storing device. The storing device merely operates as a friction device for assisting the universal bars 87 and 100 in moving the racks 83 and the sectors 14. Said frictional action is very important when the shaft 121 effects higher speed cycles, because of the higher speed of the universal bars 87 and 100 and the stronger shocks thereof.

When a new amount is to be stored into the storing device, the lever 313 is previously rocked counterclockwise thus displacing the slide 309 forwards. The cam slot 307 (FIG. 3) displaces now the lever 302 rightwards to cooperate with the cam 304. In turn the V-shaped cam slot 316 (FIG. 1) of the slide 309 rocks the lever 318 clockwise. The arm 319 is then rocked counterclockwise together with the bar 322, which is thus located on the path of the teeth 323. Upon starting a low speed cycle of the main shaft 121, the cam 304 rocks the lever 302 clockwise, whereby the bar 298 is displaced downwards together with the frame 295. The pinions 277 and 278 are thus disengaged from the racks 83. Since the bar 322 is mounted on the frame 295 no relative movement thereof occurs with respect to the pinions 277 and 278.

During the forward stroke of the universal bar 87, the racks 83 are differentially displaced rearwards. Particularly, if the amount to be stored is set up on the sectors 14 the universal bar 100 through the sectors 14 positively displace the racks 83 differentially according to said amount. On the contrary, if the amount to be stored is accumulated into the totalizer 86, the racks 83 are differentially moved rearwards by the springs 108 through the levers 106 and the pins 103. In any case the universal bar 87, through the rack 296 rotates the pinion 294 counterclockwise together with the shaft 282 and the flanges 284 and 286 (FIG. 4). These flanges thus frictionally rotate the pinions 277 and 278 until their teeth 323 (FIG. 1) contact the bar 322. The storing device is thus cleared.

At the end of the forward stroke of the universal bar 87, the cam 304 causes the spring 299 to reengage the pinions 277 and 278 with the racks 83. Thereafter the racks 83 are returned to rest by the universal bar 87 and differentially rotate the pinions 277 and 278 clockwise, thus transferring the amount represented by the racks 83 into the storing device.

An amount stored into the storing device may be picked up and transferred same to the racks 83. In this order the lever 313 is previously rocked clockwise with respect to the rest position of FIG. 1. The slide 309 is thus displaced rearwards and by means of the V-shaped cam slot 316 rocks the lever 318 clockwise, which through the arm 319 and the shaft 321 brings the bar 322 into the path of the teeth 323 of the pinions 277 and 278 in a manner similar to the above case. On the contrary, the cam slot 307 (FIG. 3) does not affect the lever 302, which therefore remains at the left of the cam 304.

Upon starting a lower speed cycle of the main shaft 121, the universal bar 87 effects its forward stroke and through the rack 296 and the shaft 282 causes the pinions 277 and 278 to be rotated counterclockwise until their teeth 323 are arrested by the bail 322. The pinions 277 and 278 thus move the racks 83 differentially rearwards, whereby the amount stored therein is transferred to the racks 83 and therefore it may be printed on the paper, accumulated in the totalizer 86, and/or back transferred into the carriage sectors 14. During the return stroke of the universal bar 87, the amount is transferred again into the pinions 277 and 278.

It is thus evident that the shaft 282 is reciprocably oscillated by the rack 296, which is operated concomitantly with the universal bar 87, and that the springs 292 cause the pinions 277 and 278 to be frictionally driven by the shaft 282, whereby an amount may be transferred from the racks to the pinions, as well as from the pinions to the racks.

When the shaft 121 is shifted rightwards to effect the higher speed cycles, the cam 304 (FIG. 3) never can affect the lever 302, whereby the frame 295 is never displaced downwards. In this case a locking member not shown in the drawings prevents the lever 313 from being rocked clockwise as well as counterclockwise in a manner known per se.

Figure 5:
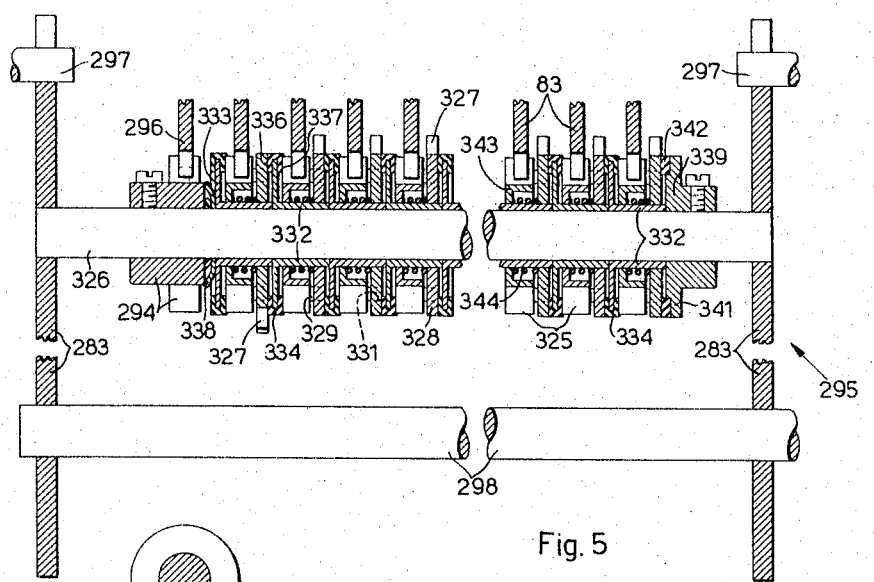
FIG. 5 is a partial transverse sectional view similar to that of FIG. 4, for a storing device according to a second embodiment of the invention.
Figure 7:
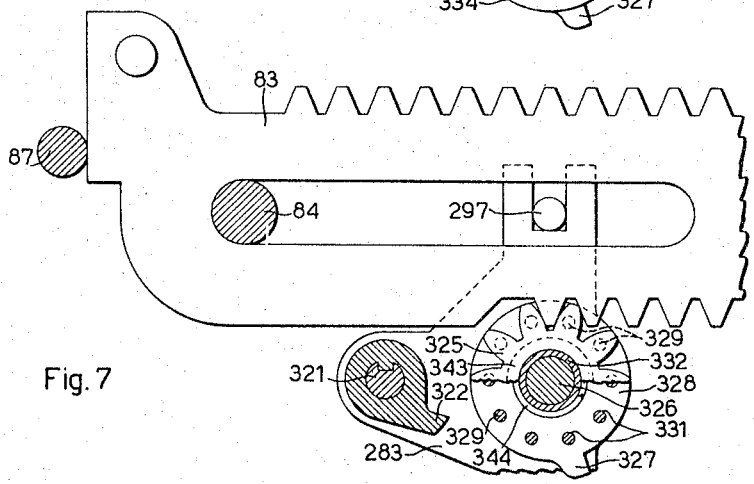
FIG. 7 is another longitudinal partial sectional view of the storing device of FIG. 5.

According to a second embodiment of the invention, the storing device comprises a set of similar pinions 325 (FIG. 5) normally engaging the racks 83 (FIG. 5). The pinions 325 are mounted on a shaft 326 rotatably mounted on the two flanks 283 of the frame 295. More particularly each pinion 325 is provided with a hub 343 rotatably mounted on a corresponding sleeve 332 in turn rotatably mounted on the shaft 326. The transverse bar 322 (FIG. 7) may cooperate with a tooth 327 of a set of disks 328 each one bodily rotatable with the corresponding pinion 325, but axially slidable with respect thereto. In this order secured to each pinion 325 is a group of pins 329 engaging a group of holes 331 provided on the corresponding disk 328. The teeth 327 are thus adapted to determine the zero position of the pinions 325.

Figure 6:
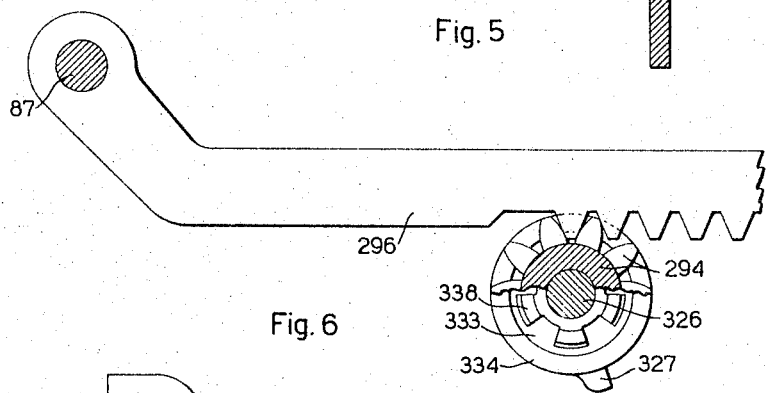
FIG. 6 is a longitudinal partial sectional view of the storing device of FIG. 5.

Secured to the left end of the shaft 326 (FIG. 6) is the pinion 294 engaging the rack 296. Each sleeve 332 (FIG. 5) is integral with a flange 333 having a ring 334 made with a material having a high coefficient of friction. The ring 334 is provided with two friction surfaces 336 and 337. Located on the shaft 326 between the pinion 294 and the first flange 333 is a star-shaped leaf spring 338 (FIG. 6). A hub 339 (FIG. 5) is adapted to be secured to the other end of the shaft 326 in an adjustable axial position in order to compress the sleeves 332 against the leaf spring 338. The flanges 333 are thus substantially bodily rotatable with the pinion 294, the leaf spring 338, the hub 339 and the shaft 326. The hub 339 is integral with a flange 341 provided with a ring 342 made with the same material of the rings 334.

Each hub 343 is provided with a cylindrical vane housing an individual compression spring 344. This latter urges the corresponding pinion 325 against the friction surface 337 of the left adjacent flange 333 and the disk 328 against the friction surface 336 of the right adjacent flange 333.

When the universal bar 87 effects its forward stroke (leftwards in FIG. 6), the rack 296 rotates the pinion 294 counterclockwise together with the shaft 326 and the flanges 333. These latter through the rings 334 frictionally drive the corresponding pinions 325 (FIG. 7) together with their disks 328. In the case of the pinions 325 engage the racks 83, these latter are thus frictionally displaced before the universal bar 100 (FIG. 1) engages the projections 101, whereas in the case the pinions 325 are disengaged therefrom the pinions 325 are zeroized. Similarly, when the universal bar 87 (FIG. 7) effects its return stroke, the rack 296 rotates the flanges 333 clockwise, whereby the rings 334 frictionally drive the pinions 325 together with the disks 328.

It is evident that many changes, improvements and additions of parts may be made to the described storing device without departing from the scope of the invention as defined in the appended claims thereof. For example the lever 313 may be automatically operated at the beginning of specific cycles of the shaft 121 instead of being manually operated before said cycles.

What we claim is:

1. In a calculating or like machine having a multiorder set up mechanism, a register, a set of actuators differentially movable according to either the amount set up on said mechanism or the total to be taken from said register under the control of a universal bar reciprocable through a forward and a return stroke, a storing device comprising a set of pinions engageable with said actuators, a shaft rotatably mounting said pinions, a zero position determining cam associated with each one of said pinions, and stop means for cooperating with said cam to stop the associated pinion at said zero position, said storing device comprising in combination:
   (a) a control means for causing said pinions to engage and disengage said actuators,
   (b) means for reciprocably oscillating said shaft concomitantly with the reciprocating movement of said universal bar,
   (c) a set of flanges bodily rotatable with said shaft, said flanges being interspersed with said pinions,
   (d) and compression springs for individually urging said pinions toward said flanges, whereby said pinions are frictionally driven by said flanges.

2. In a calculating machine or like having a multiorder set up mechanism, a register, a set of actuators differentially movable according to either the amount set up on said mechanism or the total to be taken from said register under the control of a universal bar reciprocable through a forward and a return stroke, a storing device comprising a set of pinions engageable with said actuators, a shaft rotatably mounting said pinions, a zero position determining cam associated with each one of said pinions, and normally ineffective stop means for cooperating with said cam to stop the associated pinion at said zero position, said storing device comprising in combination:
   (a) first control means normally causing said pinions to engage said actuators and operable for disengaging said pinions from said actuators during said forward stroke,
   (b) second control means operable for rendering said stop means effective,
   (c) means for reciprocably oscillating said shaft concomitantly with the reciprocating movement of said universal bar,
   (d) a set of flanges bodily rotatable with said shaft, said flanges being interspersed with said pinions,
   (e) and compression springs for individually urging said pinions toward said flanges, whereby said pinions are frictionally driven by said flanges.

3. In a calculating machine or like having a multiorder set up mechanism, a register, a set of actuators differentially movable according to either the amount set up on said mechanism or the total to be taken from said register under the control of a universal bar reciprocable through a forward and a return stroke, a storing device comprising a set of pinions engageable with said actuators, a shaft rotatably mounting said pinions, a zero position determining cam associated with each one of said pinions, and normally ineffective stop means for cooperating with said cam to stop the associated pinion at said zero position, said storing device comprising in combination:

(a) first control means normally causing said pinions to engage said actuators and operable for disengaging said pinions from said actuators during said forward stroke, (b) second control means operable for rendering said stop means effective, (c) an operating member adapted to condition said first control means to be power operated and to directly operate said second control means, (d) means for reciprocably oscillating said shaft concomitantly with the reciprocating movement of said universal bar, (e) a set of flanges bodily rotatable with said shaft, said flanges being interspersed with said pinions, (f) and compression springs for individually urging said pinions toward said flanges, whereby said pinions are frictionally driven by said flanges.

4. In a calculating machine or like having a multiorder set up mechanism, a register, a set of actuators differentially movable according to either the amount set up on said mechanism or the total to be taken from said register under the control of a universal bar reciprocable through a forward and a return stroke, a storing device comprising a set of pinions engageable with said actuators, a shaft rotatably mounting said pinions, a zero position determining cam associated with each one of said pinions, and stop means for cooperating with said cam to stop the associated pinion at said zero position, said storing device comprising in combination:

(a) first control means normally causing said pinions to engage said actuators and power operable for disengaging said pinions from said actuators during said forward stroke, (b) second control means operable for rendering said stop means effective, (c) an operating member adapted to be shifted from a rest position to a pair of effective positions, said first control means being conditionable by said member when shifted to a first position of said pair, said second control means being directly operated by said member when shifted to each position of said pair, (d) means for reciprocably oscillating said shaft concomitantly with the reciprocating movement of said universal bar, (e) a set of flanges bodily rotatable with said shaft, said flanges being interspersed with said pinions, (f) and compression springs for individually urging said pinions toward said flanges, whereby said pinions are frictionally driven by said flanges.

5. In a calculating machine or like having a multiorder set up mechanism, a register, a set of actuators differentially movable according to either the amount set up on said mechanism or the total to be taken from said register under the control of a universal bar reciprocable through a forward and a return stroke, a storing device comprising a set of pinions engageable with said actuators, a shaft rotatably mounting said pinions, a zero position determining cam associated with each one of said pinions, and stop means for cooperating with said cam to stop the associated pinion at said zero position, said storing device comprising in combination:

(a) a first control member normally causing said pinions to engage said actuators and operable for disengaging said pinions from said actuators during said forward stroke, (b) a second control member operable for rendering said said stop means effective, (c) an operating member adapted to be shifted from a rest position in each one of a pair of opposite directions, (d) a first cam member on said operating member for causing said first control member to be power operated when said operating member is shifted to a first direction only, (e) a further V-shaped cam on said operating member for operating said second control member when said operating member is shifted to each direction of said pair, (f) means for reciprocably oscillating said shaft concomitantly with the reciprocating movement of said universal bar, (g) a set of flanges bodily rotatable with said shaft, said flanges being interspersed with said pinions, (h) and compression springs for individually urging said pinions toward said flanges, whereby said pinions are frictionally driven by said flanges.

6. In a calculating or like machine having a set of reciprocable actuators, a set of reciprocable members variably settable to represent an amount, means for engaging said actuators with said settable member, and a pair of universal bars concomitantly reciprocable and adapted to alternately engage said settable members and said actuators for positively reciprocating same, a storing device comprising a set of pinions engageable with said actuators, and a shaft rotatably mounting said pinions, said storing device comprising in combination:

(a) means for reciprocably oscillating said shaft concomitantly with the reciprocating movement of said universal bars, (b) a set of flanges bodily rotatable with said shaft, said flanges being interspersed with said pinions, (c) and compression springs for individually urging said pinions toward said flanges, whereby said pinions are frictionally driven by said flanges to move said settable members and said actuators substantially before being engaged by said universal bars to reduce the shock thereof, said universal bars being adapted to positively adjust the final position thereof.

7. In a calculating or like machine having a multiorder set up mechanism, a register, a set of actuators differentially movable according to either the amount set up on said mechanism or the total to be taken from said register under the control of a universal bar reciprocable through a forward and a return stroke, a storing device comprising a set of pinions engageable with said actuators, a shaft rotatably mounting said pinions, a zero position determining cam secured to each one of said pinions, and stop means for cooperating with said cam to stop the associated pinion at said zero position, said storing device comprising in combination:

(a) control means for causing said pinions to engage and disengage said actuators, (b) means for reciprocably oscillating said shaft concomitantly with the reciprocating movement of said universal bar, (c) a set of flanges bodily rotatable with said shaft and axially slidable therealong, said flanges being interspersed with said pinions, (d) and a compression spring for urging each pair of said flanges toward a corresponding pair of pinions to cause said pinions to be frictionally driven by said flanges.

8. In a calculating or like machine having a multiorder set up mechanism, a register, a set of actuators differentially movable according to either the amount set up on said mechanism or the total to be taken from said register under the control of a universal bar reciprocable through a forward and a return stroke, a storing device comprising a set of pinions engageable with said actuators, a shaft rotatably mounting said pinions, a zero position determining cam associated with each one of said pinions, and stop means for cooperating with said cam to stop the associated pinion at said zero position, said storing device comprising in combination:
- (a) control means for causing said pinions to engage and disengage said actuators,
- (b) means for reciprocably oscillating said shaft concomitantly with the reciprocating movement of said universal bar,
- (c) a set of flanges bodily rotatable with said shaft and axially slidable therealong, said flanges being interspersed with said pinions,
- (d) and a compression spring for urging each pinion toward a corresponding flange of said set to cause said pinion to be frictionally drawn by said flange.

9. In a calculating or like machine having a multiorder set up mechanism, a register, a set of actuators differentially movable according to either the amount set up on said mechanism or the total to be taken from said register under the control of a universal bar reciprocable through a forward and a return stroke, a storing device comprising a set of pinions engageable with said actuators, a shaft rotatably mounting said pinions, a zero position determining cam associated with each one of said pinions, and stop means for cooperating with said cam to stop the associated pinion at said zero position, said storing device comprising in combination:
- (a) control means for causing said pinions to engage and disengage said actuators,
- (b) means for reciprocably oscillating said shaft concomitantly with the reciprocating movement of said universal bar,
- (c) a set of flanges bodily rotatable with said shaft and axially slidable therealong, said flanges being interspersed with said pinions,
- (d) a set of disks each one bodily rotatable with a corresponding pinion of said set and axially movable with respect thereto,
- (e) and a spring located between each disk and the corresponding pinion for urging same toward the adjacent flanges of said set.

10. In a calculating or like machine having a multiorder set up mechanism, a register, a set of actuators differentially movable according to either the amount set up on said mechanism or the total to be taken from said register under the control of a universal bar reciprocable through a forward and a return stroke, a storing device comprising a set of pinions engageable with said actuators, a shaft rotatably mounting said pinions, a zero position determining cam associated with each one of said pinions, and stop means for cooperating with said cam to stop the associated pinion at said zero position, said storing device comprising in combination:
- (a) control means for causing said pinions to engage and disengage said actuators,
- (b) means for reciprocably oscillating said shaft concomitantly with the reciprocating movement of said universal bar,
- (c) a set of flanges bodily rotatable with said shaft and axially slidable therealong, said flanges being interspersed with said pinions,
- (d) a set of disks associated with said pinions,
- (e) at least a pin on each one of said pinions for entering a hole of the corresponding disk, whereby each pinion and the corresponding disk are bodily rotatable and axially mutually displaceable,
- (f) and a spring located between each disk and the corresponding pinion for urging same toward the adjacent flanges of said set.

11. In a calculating or like machine having a multiorder set up mechanism, a register, a set of actuators differentially movable according to either the amount set up on said mechanism or the total to be taken from said register under the control of a universal bar reciprocable through a forward and a return stroke, a storing device comprising a set of pinions engageable with said actuators, a shaft rotatably mounting said pinions, a zero position determining cam associated with each one of said pinions, and stop means for cooperating with said cam to stop the associated pinion at said zero position, said storing device comprising in combination:
- (a) control means for causing said pinions to engage and disengage said actuators,
- (b) means for reciprocably oscillating said shaft concomitantly with the reciprocating movement of said universal bar,
- (c) a set of flanges interspersed with said pinions,
- (d) a sleeve integral with each one of said flanges,
- (e) a set of disks each one bodily rotatable with a corresponding pinion of said set and axially movable with respect thereto,
- (f) and means secured to said shaft and axially compressing all said sleeves for causing same to be bodily moved with said shaft.

12. In a calculating or like machine having a multiorder set up mechanism, a register, a set of actuators differentially movable according to either the amount set up on said mechanism or the total to be taken from said register under the control of a universal bar reciprocable through a forward and a return stroke, a storing device comprising a set of pinions engageable with said actuators, a shaft rotatably mounting said pinions, a zero position determining cam associated with each one of said pinions, and stop means for cooperating with said cam to stop the associated pinion at said zero position, said storing device comprising in combination:
- (a) control means for causing said pinions to engage and disengage sad actuators,
- (b) means for reciprocably oscillating said shaft concomitantly with the reciprocating movement of said universal bar,
- (c) a set of flanges interspersed with said pinions,
- (d) a sleeve integral with each one of said flanges,
- (e) a set of disks each one bodily rotatable with a corresponding pinion of said set and axially movable with respect thereto,
- (f) a first member secured substantially to one end of said shaft,
- (g) a leaf spring between said first member and the adjacent flange of said set,
- (h) and a second member adjustably secured to the other end of said shaft for causing said sleeves to be bodily moved with said shaft.

References Cited by the Examiner

UNITED STATES PATENTS

| | | | |
|---|---|---|---|
| 2,352,006 | 6/1944 | Pott | 235—60 |
| 2,733,010 | 1/1956 | Ellerbeck | 235—144 |
| 2,880,933 | 4/1959 | Westinger et al. | 235—60 |
| 3,062,444 | 11/1962 | Grip | 235—144 |
| 3,099,391 | 7/1963 | Heinze | 235—60 |

STEPHEN J. TOMSKY, *Primary Examiner.*